United States Patent
Ghanime

(10) Patent No.: US 6,591,296 B1
(45) Date of Patent: Jul. 8, 2003

(54) REMOTE NOTIFICATION OF MACHINE DIAGNOSTIC INFORMATION UTILIZING A UNIQUE EMAIL ADDRESS IDENTIFYING THE SENSOR, THE ASSOCIATED MACHINE, AND THE ASSOCIATED MACHINE CONDITION

(75) Inventor: George H. Ghanime, Ballston Spa, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/461,373

(22) Filed: Dec. 15, 1999

(51) Int. Cl.[7] .............................................. G06F 15/173
(52) U.S. Cl. ........................ 709/224; 709/217; 709/223; 702/188
(58) Field of Search ................................ 709/223, 224, 709/217; 702/188

(56) References Cited

U.S. PATENT DOCUMENTS

| | | | |
|---|---|---|---|
| 4,517,468 A | | 5/1985 | Kemper et al. |
| 5,819,110 A | * | 10/1998 | Motoyama ............. 379/100.05 |
| 5,944,787 A | * | 8/1999 | Zoken ......................... 709/200 |
| 6,065,136 A | * | 5/2000 | Kuwabara ................... 709/217 |
| 6,085,244 A | * | 7/2000 | Wookey ...................... 709/223 |
| 6,108,099 A | * | 8/2000 | Ohtani ....................... 358/1.15 |
| 6,147,601 A | * | 11/2000 | Sandelman et al. .......... 340/3.1 |
| 6,298,308 B1 | * | 10/2001 | Reid et al. ................... 702/188 |

OTHER PUBLICATIONS

Petite, "Multi–Function General Purpose Transceiver", May 31, 2001, Patent Application US 2001/0002210 A1.*

* cited by examiner

*Primary Examiner*—Nabil El-Hady
(74) *Attorney, Agent, or Firm*—Nixon & Vanderhye P.C.

(57) ABSTRACT

An email message is automatically generated when a sensor monitoring a machine detects a predetermined machine condition, such as a fault condition. When a predetermined condition is sensed, the sensor signals a local computer unit which, in turn, generates an email message that identifies the sensor, machine and site in the address of the email message. The email address for the sensor is included in the addressee line of the message. Accordingly, the addressor line of the message identifies the sensor that detected the machine condition, the machine on which the sensor is mounted and the plant location for the machine.

8 Claims, 4 Drawing Sheets

REMOTE NOTIFICATION OF MACHINE DIAGNOSTIC INFORMATION UTILIZING A UNIQUE EMAIL ADDRESS IDENTIFYING THE SENSOR, THE ASSOCIATED MACHINE, AND THE ASSOCIATED MACHINE CONDITION

BACKGROUND OF THE INVENTION

The present invention relates to remote monitoring of machinery using email (electronic mail) messaging.

In one embodiment, the invention is a machine status notification system in which an email message is automatically generated and sent when a sensor detects that a machine fails or experiences a predefined condition or abnormality. The email message may contain minimal information, such as just the email address of the sensor detecting the machine failure or other abnormality. This minimal information is sufficient to inform a service technician receiving the message of the general nature of the failure or abnormality.

Large machinery, such as generators and turbines in power plants are monitored to ensure their proper operation. Sensors on these machines monitor the machine's operating parameters, such as power output, vibration, temperature, rotating speed, fuel consumption, internal pressures, and exhaust gas temperature. There may also be a wide variety of other machine conditions monitored by various different types of sensors that monitor the machinery on an on-going basis. Each sensor monitors one operating parameter of a machine. Each sensor will, thus, generate a signal only in response to one type of machine failure or condition.

Typically, a local computer monitoring system tracks the outputs from the various sensors attached to the machine to collect and analyze the data from the sensors. The local monitoring system may be a computer unit adjacent to the machine, or a computer unit in the same building with the machines. For example, a power plant may have a monitoring station at each of the larger turbo-machinery stations to continually monitor the operating conditions of these machines and track their operation. The monitoring system allows on-site human operators to determine if corrective action is needed to the machinery. However, the on-site monitoring system often does not provide for remote notifications to service personnel located off-site from the machinery of on-site problems with the machinery.

In certain instances, remote monitoring of machinery has been done by computer systems that establish a direct land-line connection or other direct telephony connection to the on-site operating system. An on-site computer system collects data from the machine sensors and sends the data to a remote computer system. The remote system receives data that has been collected and analyzed by the on-site monitoring system. Using the remote computer system, a technician or engineer at a remote site, e.g., the manufacturing facility that made the machine, can obtain the data from the on-site system, download that data, and then review the data and diagnoses the machine trouble or failure without having traveled to the machine location. One such monitoring system is disclosed in U.S. Pat. No. 4,517,468 entitled "Diagnostic System and Method."

A difficulty with existing remote monitoring systems is the need to establish telephone connections with the location having the machinery. These telephone connections may be over long distance connections, and could be overseas telephone connections if the machinery is located on one continent which is different from the manufacturer of the machine. Accordingly, establishing direct telephone connections with remote machinery can be both expensive and difficult for extremely long-distance connections.

The Internet provides a means to avoid long distance telephone connections between machinery and remote monitoring stations. Internet messaging is commonly used between individual persons to communicate with one another. Accordingly, the Internet provides a means to avoid having to establish direct connections between a machine site and a remote monitoring station.

There is a long-felt need for remote monitoring and notification of irregular conditions of and anomalous behavior by machinery. By way of example, power plant machinery that is monitored on site by sensors may be serviced by off-site personnel, such as manufacturer's representatives who also require remote monitoring by organizations, such as the manufacturer, responsible for warranty service for the machines. There is a need for remote notification of machine failures and other abnormal conditions which are automatically sent via the Internet to a remote location for review by service personnel.

BRIEF SUMMARY OF THE INVENTION

A system has been developed in which email notification is used to remotely monitor machine and to report faults in those machines. The email messages are automatically generated by the machine and/or local computer unit. A machine fault or other condition is detected by one or more sensors monitoring the machine. A signal issued by the sensor in response to the detected fault or other condition prompts a computer system to generate an email message. The message identifies as its address source, i.e., addressor, an address that uniquely identifies the sensor which detected the fault or other machine condition. The message is sent via the Internet to an addressee, who may be an off-site machine maintenance technician, manufacturer's representative or other individual. The addressee, upon reading the addressor listed in the email message, is able to determine the sensor which detected the machine fault or condition, the machine that the sensor is monitoring, and the site facility at which the machine is located.

A machine is assigned a group of email addresses, where each address corresponds to one of the various sensors monitoring that machine. Each email address itself identifies the sensor, the machine to which the sensor is monitoring and the plant location of the machine. The email address of the sensor alone provides sufficient information to identify the sensor, machine being monitored by the sensor and the machine site.

An email message from a machine sensor is automatically generated when the sensor detects a predetermined machine condition, such as a fault condition. When a predetermined condition is sensed, the sensor signals a local computer unit which, in turn, generates an email message that identifies the sensor, machine and site. Specifically, the email address for the sensor is included in the addressor line of the message. The addressor line of the email message identifies the sensor that detected the machine condition, the machine on which the sensor is mounted and the plant location for the machine.

The email message may contain no information other than the email address of the sensor that caused the message to be generated. A technician or other person receiving the email message from the machine sensor can determine directly from the email address alone the following: (1) the sensor which caused the message to be generated, (2) the machine which the sensor is monitoring, and (3) the plant or other facility at which the machine is located.

An email message that conveys only the address of its sender may be used to notify a service technician at a remote site of a machine failure or other condition. Moreover, if the machine condition causes more than one sensor to generate a fault signal, then multiple email messages will be generated. Multiple email messages from various sensors will provide additional information on the condition of a machine.

DETAILED DESCRIPTION OF THE DRAWINGS

Figure 1:
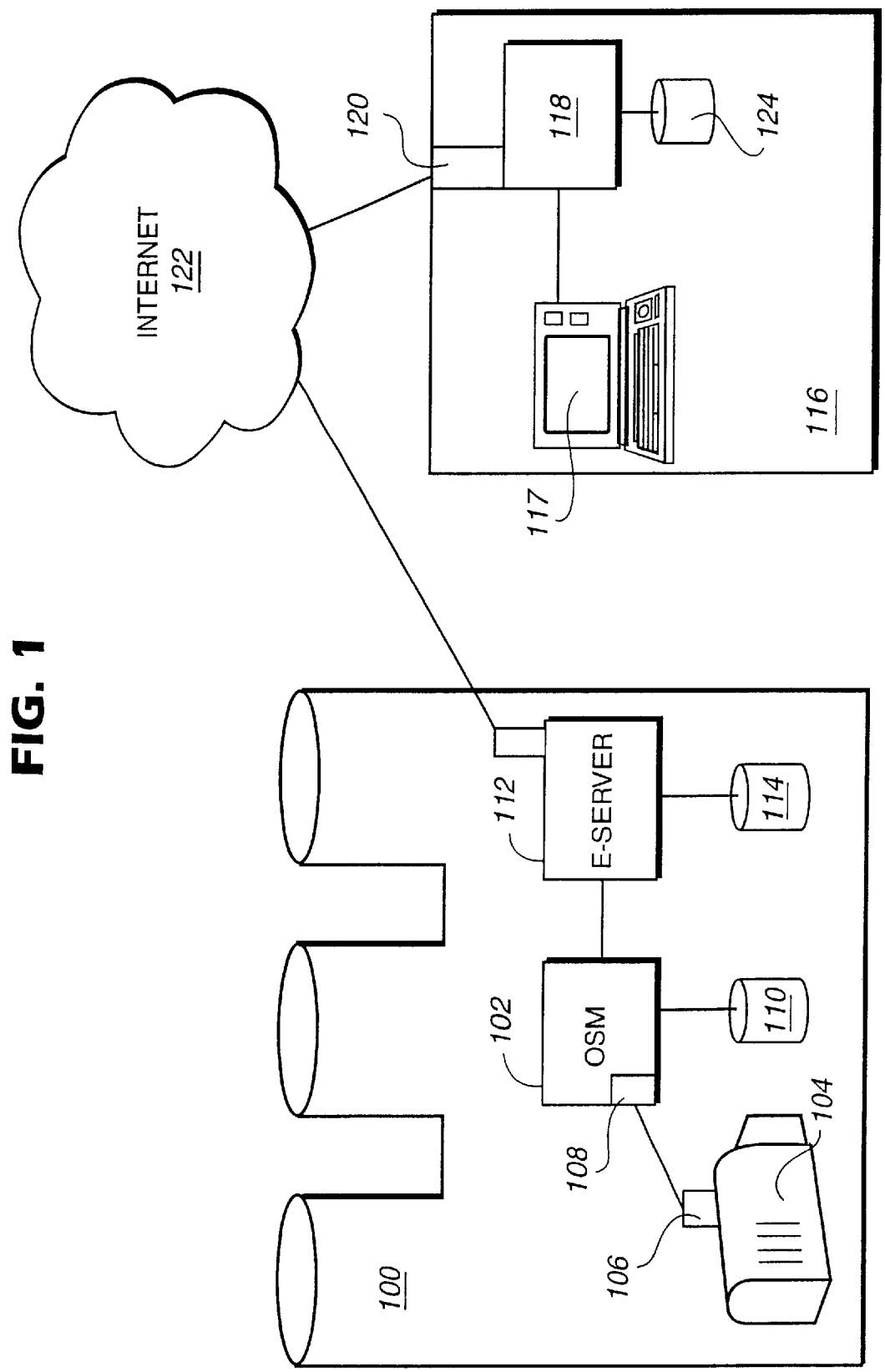
FIG. 1 is a schematic diagram showing an onsite machine monitoring system, and a remote diagnostic system having email reception and operators for acting on remote notification.

FIG. 1 shows a schematic diagram of a machine and an on-site monitoring system for the machines, and remote computer system. In particular, FIG. 1 shows a power generation facility 100. The power station 100 includes an onsite monitor system 102 (OSM) that includes computer systems to monitor the power generation machinery in the power station. For example, the onsite monitor system 102 may monitor machines 104, such as electrical generators, steam turbines and gas turbines that are operated within the power system. The onsite monitor system is coupled to a variety of sensors 106 monitoring various power generation machines 104 within the power facility 100. The sensors 106 may include vibration sensors, temperature sensors, voltage and current sensors, machine rotational speed sensors, and other sensors.

The onsite monitor system 102 may include a conventional computer monitoring system used in power plants to track the operation of the various power generation machinery 104, and to detect failures and other anomalous conditions of the machinery. The OSM 102 may include conventional instruments and computers 108 that poll the sensors 106. The instruments and computers 108 process the sensor signals using various computer software algorithms that determine whether the sensor signals fall within the acceptable ranges of machine performance, as prescribed in computer databases 110 associated with the OSM.

These databases 110 may include information regarding acceptable operating limits for the power generation equipment. The database 110 may further include information useable by the OSM computer to determine when a fault condition or other anomalous machine condition exists with respect to any of the sensors 106 that monitor the power generation equipment.

The OSM 102 further includes an email server 112 that generates an email message when a sensor signals indicates that a machine fault or other anomalous machine condition exists. The determination of whether a sensor has detected a machine fault or other condition is made by the instruments and computer 108 tracking the sensors. When a sensor signal is interpreted as indicating a machine fault or other such machine condition, the instruments and computer 108 issue a message to the email server 112 for an email message to be issued that lists as the originating source the sensor that detected the fault or other such condition. Accordingly, as the OSM detects an erratic machine behavior, it remotely notifies via email a remote monitoring and diagnostic center (MDC).

The email server 112 has an email database 114 listing email accounts corresponding to each of the machine sensors. The sensor is assigned a unique email account. The email account may be given a descriptive name (address) revealing the nature of the sensor and the location. For example, an email address for a vibration sensor 106 may include the identifier "VIBPROBE#", where #identifies the number of a particular vibration sensor on a machine 104. When a fault is detected, the sensor generates the fault and the OSM generates an email message listing the email account name for the sensor which generated the fault. Similarly, the email address may also identify the type of machine 104, e.g., "GEN" for a generator, to which the sensor is monitoring.

For example, if the OSM detects an alarm at vibration probe No. 1 of generator unit 1 at a plant facility named Pepco 1, then the email address identifying that particular sensor may be as follows: "vibprobe1gen1@pepco1.com". This email address by itself identifies the sensor (106) as "vibprobe 1", monitoring generator (104) No. 1, at the "pepco1" powergeneration facility (100).

The email message from the power generation facility 100, e.g., Pepco, is received by a remote monitoring and diagnostic center (MDC) 116. The MDC includes a computer system 118 having a communication unit 120 connection to receive email messages from the email server 112 at the onsite monitor (OSM) 102. The email message may be sent via the Internet 122.

A human operator at the MDC 116 receives the email message form the OSM. The human operator views a display 117 that shows an email message that identifies the addressor as the email name of the power generation site, an identification of particular machinery unit and an identification of the sensor generating the email message. From this email address alone, the human operator at the MDC may have sufficient information to begin an investigation as to the machine fault or other error occurred at the power generation facility.

The operator at the MDC facility may be particularly trained in the machinery onsite of the power generation facility. For example, the MDC may be at a manufacturer's site, staffed by the manufacturer's engineers and technicians, and have access to manufacturing information and historical information regarding the machine. The MDC center has computer systems which are capable of identifying based on the email address, the sensor 106, machine 104 to which the sensor is attached and the onsite facility 100 where the machine and associated sensor are located. The MDC computer system may include a database 124 that correlates each email address to its associated sensor 106, machine 104 and site facility 100.

Once an email address is received, the MDC computer by accessing its database 124 can provide information to its operator regarding the particular power location machinery and sensor which generated the email. This information may include a description of the machinery and sensor and machinery condition which is being sensed. This information will assist the operator in diagnosing the fault. The information included at the MDC center may also be historical information regarding the machinery and prior messages received from the sensor. Accordingly, the operator may have the benefit of the historical information regarding the machinery and the particular sensor which would be useful in diagnosing the machine. The operator at the MDC can then telephone or otherwise communicate with the onsite maintenance personnel to diagnose the error and otherwise fix the machinery.

Figure 2:
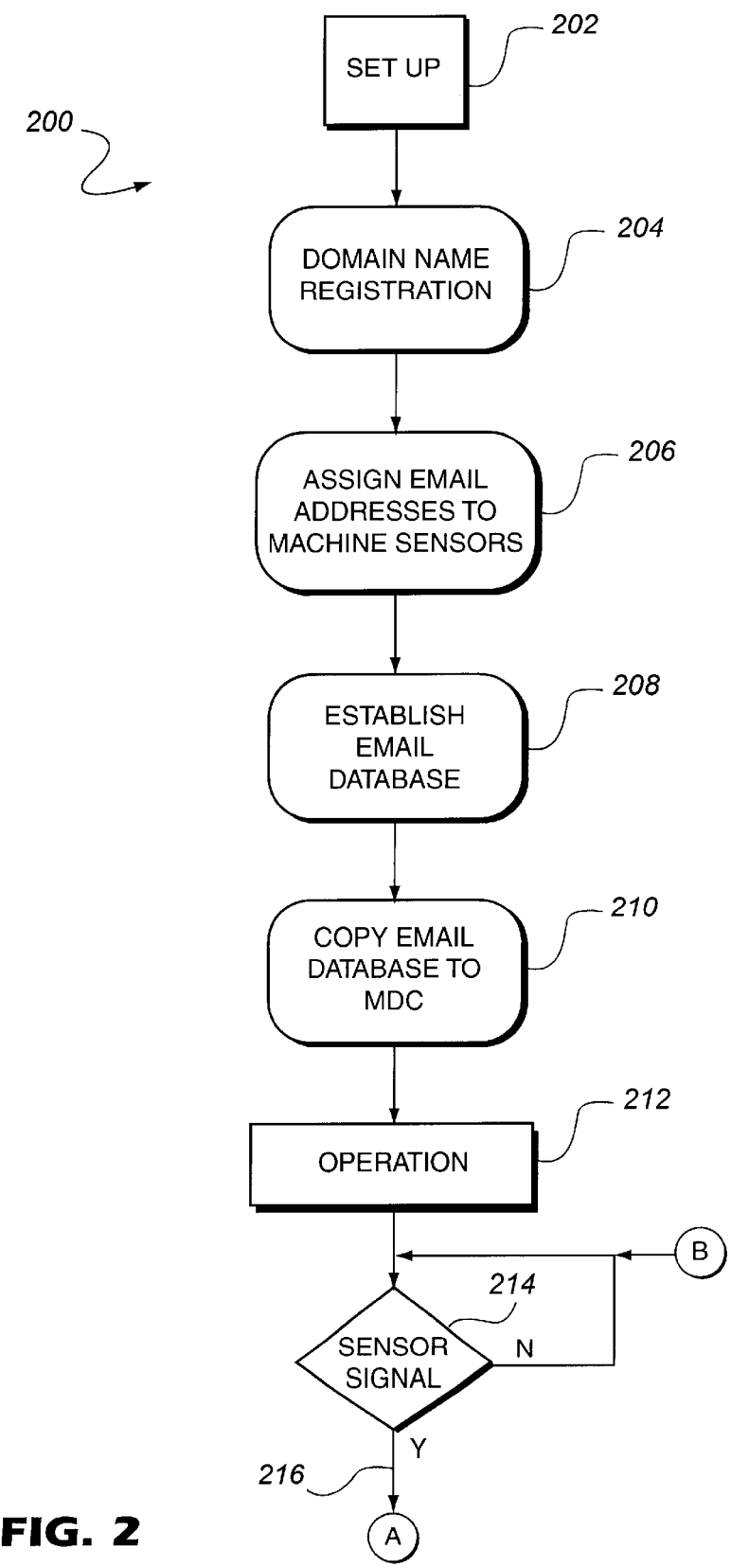
FIGS. 2 and 3 show a flow chart showing steps in remote email notification of machine faults and anomalies in response thereto.
Figure 3:
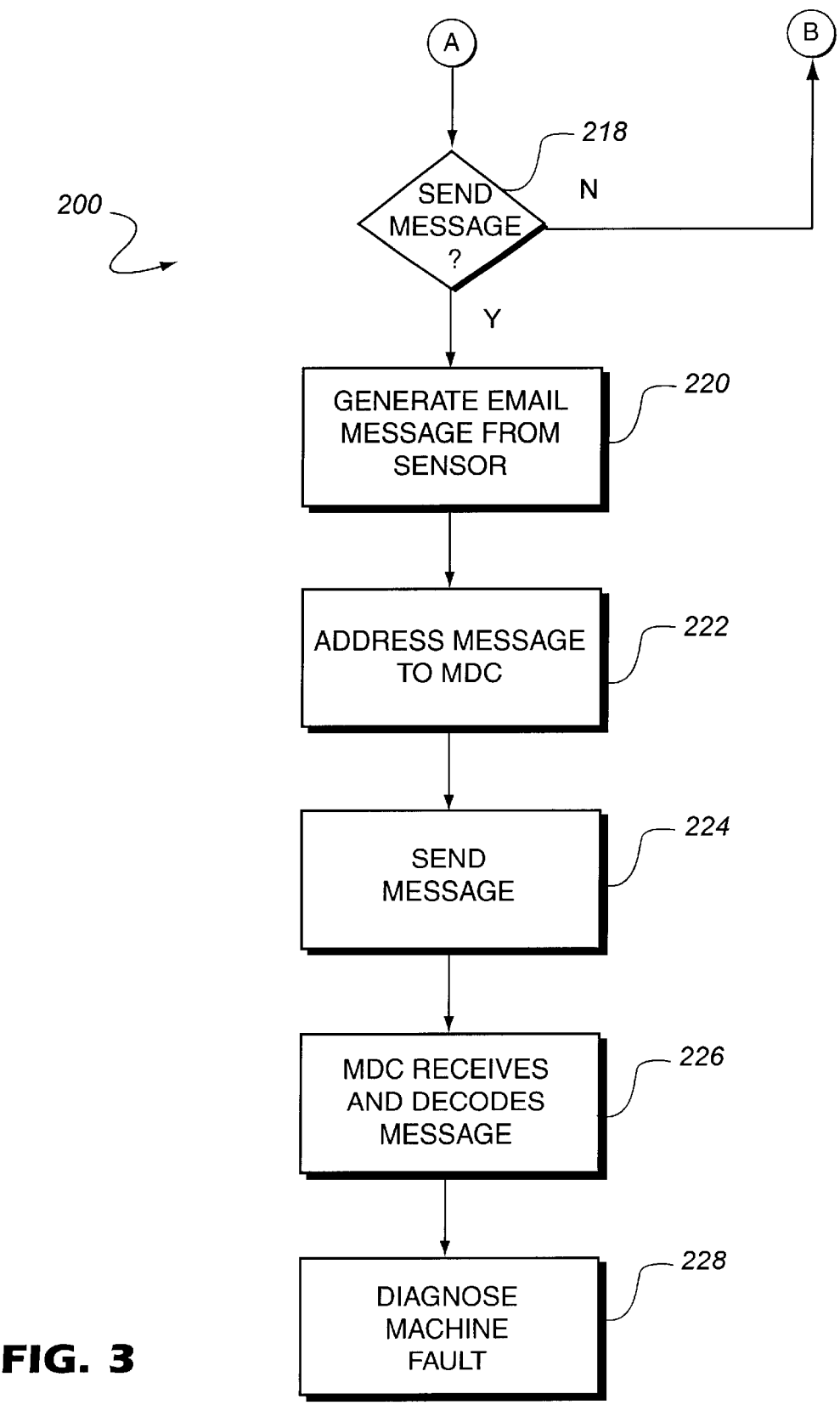

FIGS. 2 and 3 are a flow chart 200 showing the operational steps associated with setting up remote email notification of machine faults and the generation of such email. In particular, during the setup phase 202 of the system, email accounts are established for each sensor. To establish a new email account, a website domain name, step 204, is selected which is preferably descriptive of the particular power generation facility. For example, the domain name may be selected to identify the customer and customer site location, such as "pepcodc.com" to designate a Potomac Electric Company (PEPCO) power facility at Washington, D.C. Once the power generation facility has a domain name, email addresses can be assigned to the various sensors 106 attached to the machines 104 step 206.

Each email address may be created to be descriptive of the machinery and sensors associated with it. For example, the email address may include designations such as "generator", "gas", and "steam" to provide an indication that the machinery associated with the address is either a generator, a gas turbine, or a steam turbine, respectively. Similarly, a portion of the email address may also include a designation identifying particular sensor probe sites, such as vibration probe (VIB), temperature probe (TEMP) or other type of probe. By combining these designations of sensors and machinery types, a descriptive email address is established in step 206. For example, a vibration probe attached to a generator may have an email address such as "vib1gen1@pepcodc.com" designating vibration probe No. 1, attached to generator unit No. 1 at the D.C. facility for the Pepco power utility.

A computer operator associated with the onsite monitor establishes the email addresses for the various machinery units and sensors at the plant in step 208. These addresses are maintained in a database 124 accessible by the email server maintained at the OSM, in step 208. This database(s) 112 includes the email address of the sensors 106, and may include information regarding the type of sensor and which machine 104 that the sensor is monitoring. The databases of email addresses 112 are transmitted to the remote MDC 118 to be stored at a database 124 at the remote MDC location, in step 210. By maintaining at the MDC a copy of the email database of sensor address, a technician at the MDC may look up additional information regarding a sensor and its machine by accessing the database.

During the operational phase of the process, step 212, the OSM 102 monitors the sensors 106 attached to the various machinery in the power plant in step 214. When the sensor generates a failure or other anomaly signal (216) the instrumentation and computer system 108 determines whether an email message should be issued, in step 218. If a message is to be sent, then the email server 112 associated with the OSM 102 generates the email message that identifies as the originating source of the message, e.g., email addressor, the sensor which causes the message to be generated in step 220. The message is addressed, step 222, to the MDC responsible for monitoring the machine being monitored. In particular, the email database 114 includes information on the addressee corresponding to each sensor email address.

The email/message is sent and the MDC receives the email message (224). The email address identifies the plant location, the machinery and sensor. The MDC receives the message and may effectively decode (226) the sensor address using its database 124 to identify the particular sensor that generated the email. Using information and expertise generated by the MDC, an investigation as to the cause of the fault can be begun, in step 228. In addition, an operator at the MDC may telephone or otherwise communicate with the maintenance personnel at the power plant to diagnose and fix the problem.

Figure 4:
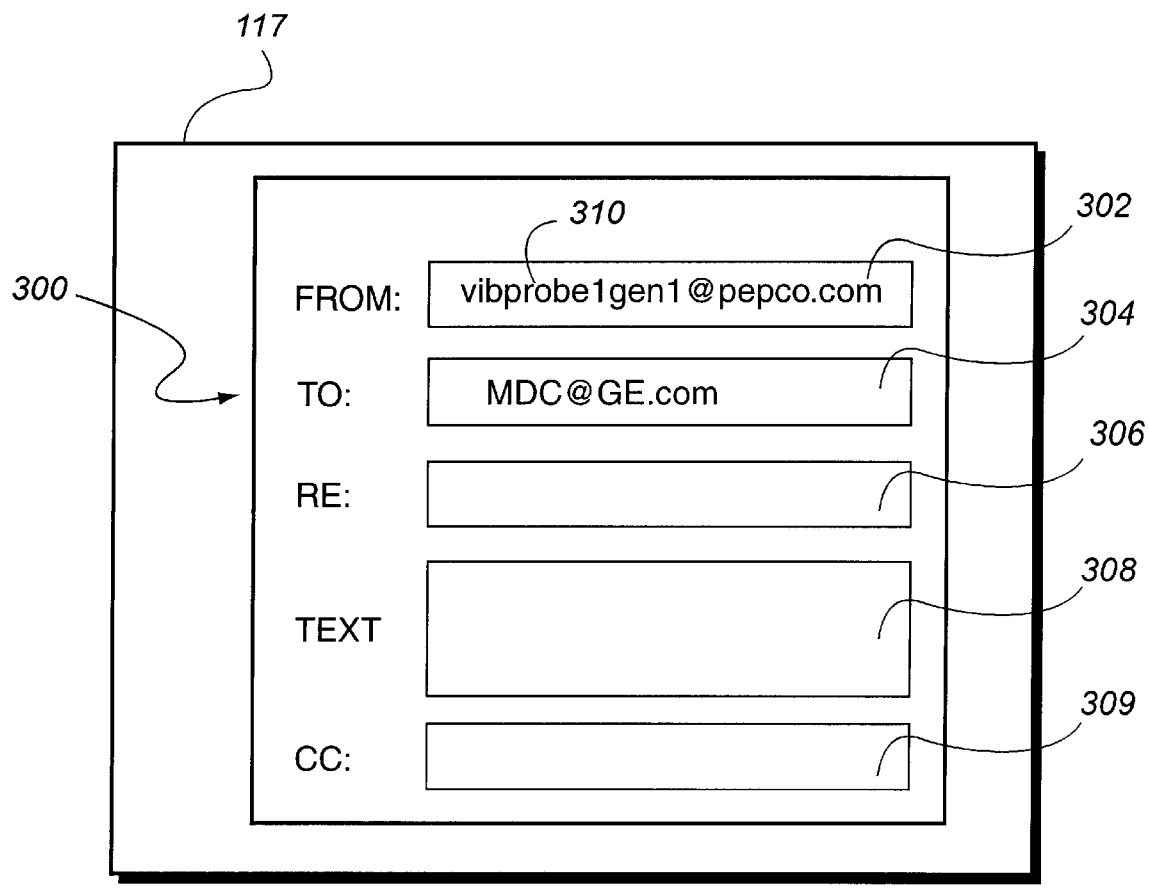
FIG. 4 is an exemplary email message having an address identifying a machine sensor.

FIG. 4 shows an exemplary email message 300 on a display 117 at the MDC. The message may include an addressor line 302, an addressee line 304, a subject line 306, and a description section 308. As shown in the figure, the subject line 307 and description sections 308 are blank and contain no information. A copied line 309 for email addresses of other addressees receiving copies of the message may be filled out with addresses of other MDCs. The addressor line 304 includes an email address 310 of the sensor which caused the email message 300 to be generated. The address 310 identifies vibration sensor No. 1, on generator No. 1, at the Pepco D.C. utility plant. The addressee line 304 includes the address of the intended recipient of the email message, such as a remote monitoring and diagnostics center at the manufacturer for the machine having the sensor that generated the email message.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for notifying a remote location of a machine condition using a local computer system and a remote computer system communicating with each other, wherein the method comprises:

a) monitoring a machine with a plurality of sensors which each detect a predetermined machine condition;

b) assigning a unique email address to each of the sensors, where the address identifies the sensor;

c) automatically generating an email message after one of the sensors detects the predetermined machine condition, where the addressor of the message is the email address of the sensor detecting the condition and the address of the sensor includes information sufficient to identify the sensor and its associated machine;

d) sending the email message to the remote computer system, and e) the remote computer system receiving the email message and determining that the predetermined condition has occurred at the monitored machine based on the email address of the received email message.

2. A method for notifying a remote location of a machine condition as in claim 1 further comprising the step of identifying the sensor in step (e) that detected the predetermined machine condition based on the email address of the received email message.

3. A method for notifying a remote location of a machine condition as in claim 1 wherein the address of the sensor identifies the machine that the sensor is monitoring.

4. A method for notifying a remote location of a machine condition as in claim 1 wherein the address of the sensor identifies a site at which the sensor is located.

5. A method for notifying a remote location of a machine condition as in claim 1 wherein the address of the sensor includes a unique name identifying the sensor and machine being monitored by the sensor, and a domain name identifying a site at which the sensor and machine are located.

6. A method for notifying a remote location of a machine condition as in claim 1 further comprising the step of storing a database correlating each email address of a sensor with information regarding the sensor.

7. A method for notifying a remote location of a machine condition as in claim 1 further comprising the step of storing a database at the remote location, where the database correlates the email addresses of the sensors with information regarding the machine being monitored by the sensors.

8. A method for notifying a remote location of a machine condition using a local computer system and a remote computer system communicating with each other, wherein the method comprises:

a) monitoring a machine with a plurality of sensors which each detect a predetermined machine condition;

b) assigning a unique email address to each of the sensors, where the address identifies the sensor;

c) automatically generating an email message after one of the sensors detects the predetermined machine condition, where the addressor of the message is the address of the sensor detecting the condition and the address of the sensor includes information sufficient to identify the sensor and its associated machine;

d) sending the email message to the remote computer system, and e) determining at the remote location that the sensor corresponding to the unique email address has detected the predetermined condition based on the email address alone, and identifying the sensor, machine and machine location using the unique email address.

\* \* \* \* \*